United States Patent [19]

Haas et al.

[11] Patent Number: 4,527,716
[45] Date of Patent: Jul. 9, 1985

[54] APPARATUS FOR DISPENSING MATERIAL FROM A BAG

[75] Inventors: Louis M. Haas; Joy L. Williams, both of Newark; Boyd E. Smith, Fremont, all of Calif.

[73] Assignee: Cargill, Incorporated, Minneapolis, Minn.

[21] Appl. No.: 494,182

[22] Filed: May 13, 1983

[51] Int. Cl.³ .................... B67B 7/26; B65G 65/34
[52] U.S. Cl. .................... 222/83.5; 222/105; 222/160; 222/181; 414/412; 414/786; 248/97
[58] Field of Search ............... 222/181, 203, 83.5, 222/81, 88, 83, 105, 162, 160; 248/97, 98, 95; 414/412, 403

[56] References Cited

U.S. PATENT DOCUMENTS

| | | | |
|---|---|---|---|
| 544,689 | 8/1895 | Quaintance | 248/95 |
| 553,752 | 1/1896 | Goff | 222/181 |
| 3,372,725 | 3/1968 | Voorhees | 222/105 |
| 4,165,024 | 8/1979 | Oswalt et al. | 222/181 |
| 4,194,652 | 3/1980 | Williamson et al. | 222/181 |

FOREIGN PATENT DOCUMENTS

| | | | |
|---|---|---|---|
| 2389471 | 5/1977 | France | 414/412 |
| 361936 | 2/1973 | U.S.S.R. | 414/412 |

Primary Examiner—Joseph J. Rolla
Assistant Examiner—Andrew Jones
Attorney, Agent, or Firm—Fitch, Even, Tabin & Flannery

[57] ABSTRACT

A method and apparatus are provided for dispensing material from a bulk bag wherein the bag is supported from below by a cradle having a central opening through which material from the bag may pass. An overhead support is employed to prevent the bag from collapsing downwardly as the bag empties. The apparatus includes a discharge assembly positioned beneath the opening and extending generally downwardly therefrom for receiving material from the bag and directing the material to a desired location.

8 Claims, 4 Drawing Figures

U.S. Patent   Jul. 9, 1985   4,527,716
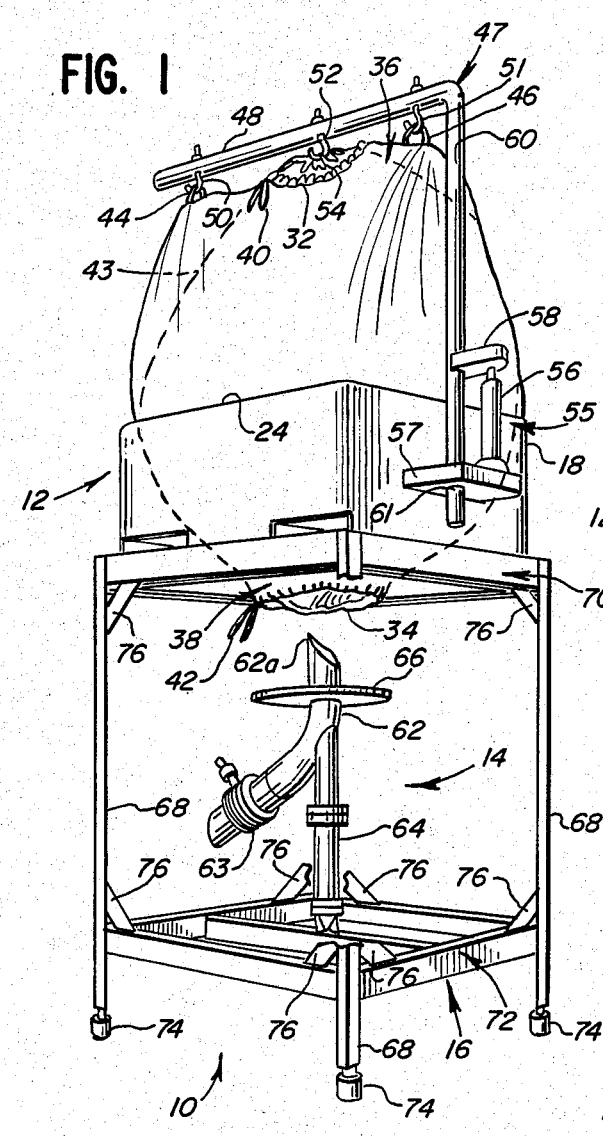
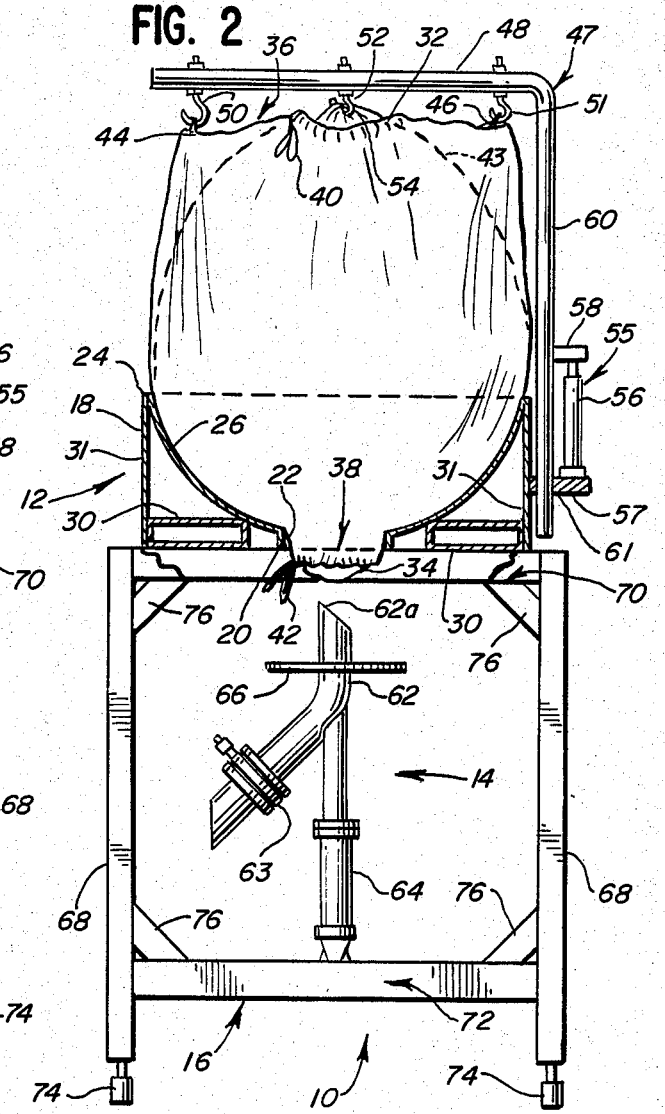
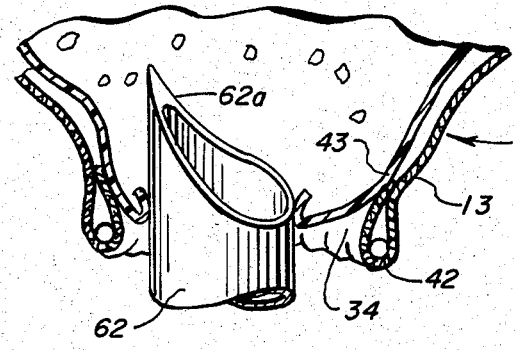
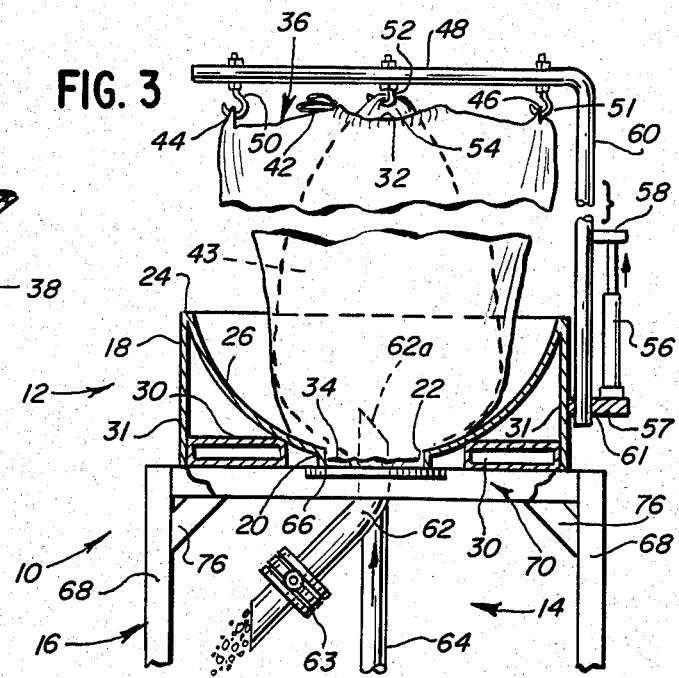

APPARATUS FOR DISPENSING MATERIAL FROM A BAG

BACKGROUND OF THE INVENTION

The present invention relates to a method and apparatus for dispensing materials from large, flexible bags.

Materials such as granular salt are commonly packaged in bulk bags, which contain a large quantity of material and are quite heavy, and from which relatively small quantities of the material can be dispensed into smaller containers over a period of time. One type of known bulk bag has openings at its upper and lower ends which may be held closed by drawstrings and has a pair of straps attached near its upper end to enable the bulk bag to be suspended from an overhead support. This type of bag may be used in combination with an inner liner which seals the material inside the bag from dirt, moisture, and air. Such inner liners are generally used where a food grade product, such as salt, is contained within the bag. The inner liners are commonly made of thin, flexible plastic material .

A known method for dispensing material from bags of this type comprises suspending the bulk bag from an overhead support by the straps, opening the lower end of the bag at the lower drawstring, and slitting the inner liner to enable the material to flow downwardly out of the lower end of the bag. The bag may then be reclosed after a desired quantity has been dispensed by pulling the drawstring closed.

One disadvantage of this method is that it may be unsafe to suspend the bulk bag, which contains a large amount of product, from an overhead support by the straps. Opening the drawstring at the bottom of the bag and slitting the inner liner may require a worker to stand beneath the bag in such a position that the worker is vulnerable to injury should one of the straps or the overhead support fail.

Another disadvantage of this method is that repeatedly opening and closing the bag with the drawstring is inefficient and inconvenient, particularly where a single bag must be opened and closed a large number of times to fill a large number of relatively small containers.

SUMMARY OF THE INVENTION

In accordance with the present invention, a method and apparatus are provided for dispensing material from a bulk bag wherein the bag is supported from below by a cradle having a central opening through which material from the bag may pass. An overhead support is employed to prevent the bag from collapsing downwardly as the bag empties. The apparatus includes a discharge assembly positioned beneath the opening and extending generally downwardly therefrom for receiving material from the bag and directing the material to a desired location. The discharge assembly includes a valve for controlling the flow of material through the discharge assembly. In the preferred embodiment, the discharge assembly includes a discharge tube which is pointed at its upper end and is vertically movable so that it may be forced upward to pierce an inner liner of the bag. Material may then be discharged directly from the bag through the discharge tube to a desired location. The preferred discharge assembly further includes sealing means for restricting communication through the opening in the liner outside of the discharge tube.

Accordingly, it is an object of the present invention to provide an improved apparatus for supporting a bulk bag and enabling material to be dispensed therefrom.

It is a further object of the present invention to provide improved means for controlling the flow of material being dispensed from a bulk bag.

It is an additional object of the present invention to provide a novel method for dispensing material from a bulk bag wherein the bag is securely supported from below and wherein an inner liner within the bag may be pierced by a power driven device rather than cut open manually.

It is an additional object of the present invention to provide apparatus for piercing an inner bag liner while simultaneously providing means for directing the flow of material from the interior of the bag to a desired location

BRIEF DESCRIPTION OF THE DRAWINGS

FIG. 1 is a perspective view of dispensing apparatus in accordance with the present invention, shown with portions broken away for clarity.

FIG. 2 is a front elevational view of the apparatus of FIG. 1, shown partially in section and with portions broken away for clarity.

FIG. 3 is a foreshortened front elevational view of the apparatus of FIG. 1, shown partially in section and with portions broken away for clarity, and showing the discharge assembly in its upper position.

FIG. 4 is a fragmentary perspective view of the upper end of the discharge tube and the lower section of a bag and liner, shown partially in section.

DESCRIPTION OF THE PREFERRED EMBODIMENT

The present invention is generally embodied in a method and apparatus for supporting a large, heavy bulk bag in an elevated position and dispensing material from the bag. The apparatus, indicated generally at 10, includes a cradle assembly 12 for supporting the bulk bag 13, a discharge assembly 14 positioned beneath the cradle assembly 12 for receiving material from the bag 13 and directing it to a predetermined location, and a frame 16 for supporting the discharge assembly 14 and the cradle assembly 12 in predetermined relation to one another. In the illustrated embodiment, the cradle assembly 12 includes a generally bowl-shaped cradle 18 having a generally circular opening 22 at its bottom for passage of material from the bulk bag. The illustrated cradle 18 has a generally rectangular upper rim 24 and a concave inner surface 26 which defines the generally circular opening 22 located at the center of the bottom 20 of the cradle 18. A pair of hollow frame members 30 of generally rectangular cross section are disposed on opposite sides of the cradle 18 and generally parallel to one another for receiving tines of a fork lift truck within their respective interiors. Generally vertical sidewalls 31 extend downwardly from the rim 24 of the cradle 18 outside of the inner surface 26 to the hollow frame members 30.

The illustrated bulk bag 13 has openings 32 and 34 at its upper and lower ends 36 and 38 respectively which may be held closed by drawstrings 40 and 42, and has an inner liner 43 made of thin, flexible plastic material. The bulk bag 13 is supported in the cradle 18 with the opening 34 at its lower end positioned so as to be accessible through the opening 22 in the bottom of the cradle 18.

The bag has looped support straps 44 and 46 affixed to its upper end 36.

In the past, bulk bags of this type have commonly been suspended from overhead supports while material is dispensed from the lower end of the bag. When a bag 13 is supported from below in accordance with the present invention, it has been found that the bulk bag 13 and the liner 43 may collapse downwardly as they empty, which may interfere with the flow of material, unless upper portions of the bag and liner are supported.

In accordance with the present invention, an overhead support 47 is provided to uphold the upper end 36 of the bag 13 and an upper portion 54 of the liner 43 to prevent them from collapsing downwardly as the bag empties. The overhead support 47 includes a generally horizontal cross bar 48 which has carrying means such as hooks 50, 51 and 52 depending from it for engagement with the straps 44, 46 on the bag 13 and the upper portion 54 of the liner 43. The center hook 52 has a pointed end for impaling the upper portion of the liner 43.

In the illustrated embodiment, means 55 are provided for raising and lowering the cross bar 48 so that the hooks 50, 51 and 52 may be attached to the straps 44, 46 and liner 43 while the cross bar is in a lowered position and the cross bar may be subsequently raised to place tension on the straps and on the upper portion of the liner. This prevents the bag 13 and liner 43 from collapsing downwardly and facilitates flow of material from the bulk bag through the opening 34 at the lower end of the bag. The preferred means 55 for raising and lowering the cross bar 48 comprises a vertically disposed fluid pressure cylinder assembly 56 having its lower end fixed to a lug 57 on one of the sidewalls 31 of the cradle 18 and having its upper end fixed to a lug 58 on a vertical member 60 connected to the cross bar 48. The lower lug 57 has a vertical bore 61 formed through it for sliding engagement with the vertical member 60.

The preferred discharge assembly 14 includes a downwardly extending discharge tube 62 which has a valve 63 at its lower end and is sharpened to a point at its upper end 62a (FIG. 4). A fluid pressure cylinder assembly 64 or other suitable source of mechanical force is employed to support the discharge tube 62 and shift it between an upper position (FIGS. 3 and 4) and a lower position (FIGS. 1 and 2).

The discharge tube 62 is normally maintained in the lower position as the cradle assembly 12 is placed on the frame 16 with an unopened bag 13 in position on the cradle 18. The discharge tube 62 is shifted to the upper position after the cradle assembly 12 is in place to pierce the inner liner 43 of the bulk bag 13 and enable material to be dispensed from the bag. When the discharge tube 62 is in its upper position, an annular collar 66 abuts the opening 22 in the bottom of the cradle 18 to form a seal.

The frame 16 in the preferred embodiment employs four legs 68 which support an upper platform 70 upon which the cradle assembly 12 rests and a lower platform 72 which supports the lower end of the fluid pressure assembly 64. Adjustable feet at 74 are provided to facilitate levelling of the apparatus. Braces 76 are employed to add structural rigidity and strength at the joints of the frame 16.

In accordance with the first step of the method of the present invention, the bag is placed on the cradle assembly 12 while the cradle assembly rests on a floor surface. While the cradle assembly 12 and bag 13 rest on the floor and are easily accessible to workers, the straps 44 and 46 on the bag may be hung on the hooks 50 and 51 of the cross bar 48. If the bag has an inner liner 43, the upper end 36 of the bag 13 may be opened by releasing the drawstring 40 and the upper portion 54 of the liner 43 may be pulled through the opening and impaled on the center hook 52 on the cross bar. After the straps 44 and 46 and liner 43 have been thus secured, the fluid pressure cylinder 56 may be employed to raise the cross bar 48 and apply tension to the straps 44, 46 and liner 43. The cradle assembly 12 and bag 13 may then be lifted by the fork lift and truck placed upon the frame 16.

When the bag 13 has a liner 43, the discharge tube 62 is forced upward to pierce the liner after the drawstring 42 at the lower end of the bag is loosened to expose the liner. As the discharge tube 62 is shifted into its upper position, the sealing collar 66 fixed to the exterior of the discharge tube is forced upward against the bottom 20 of the cradle 18 to restrict communication between the interior and exterior of the liner 43 outside of the discharge tube 62 which extends through the liner 43. As the bag empties, the crossbar 48 may be raised further as shown in FIG. 3 to facilitate flow of material out of the bag 13. The valve 63 is used to regulate the flow of material through the discharge tube 62.

Where a bag with no liner is used, a discharge assembly 14 having a hopper (not shown) for receiving material flowing downwardly from the lower end of the bag may be employed instead of the illustrated discharge assembly. The lower drawstring need only be released to open the lower end of the bag and the material can flow from the bag into the funnel or hopper and downwardly through the discharge tube. The flow of material may then be regulated conveniently by valve means on the discharge tube rather than by opening and closing the lower end of the bag.

From the foregoing it will be appreciated that a method and apparatus are provided which enable material to be dispensed from a bulk bag more safely and efficiently than in the past. While preferred embodiments have been shown and described herein, there is no intent to limit the invention to any particular embodiments. The scope of the invention is defined by the language and spirit of the appended claims.

What is claimed is:

1. Apparatus for dispensing material from a bulk bag having an inner liner and having open upper and lower ends which may be held closed by drawstrings, the apparatus comprising:

a cradle assembly for supporting the bag, the cradle assembly including a cradle having a bottom portion defining an opening through which material from the bag may be passed, a pair of generally horizontal frame members of generally rectangular cross-section disposed on opposite sides of the cradle assembly for accommodating fork lift tines, and an overhead support assembly for upholding the upper end of the bag as the bag empties;

a discharge assembly including a discharge tube positioned beneath the opening in the cradle for receiving material from the bag and having a sharpened upper end for piercing the liner of the bag, valve means for regulating the flow of material through the discharge tube, a collar affixed to the exterior of the tube near its upper end to restrict communication between the exterior and the interior of the bag liner adjacent the exterior of the tube, and drive means for raising and lowering the discharge tube; and a frame for supporting the cradle assembly and discharge assembly in predetermined relation to one another.

2. Apparatus in accordance with claim 1 wherein the means for raising and lowering the discharge tube includes a fluid pressure cylinder.

3. Apparatus in accordance with claim 1 wherein the overhead support assembly includes a generally horizontal cross bar having a plurality of support means depending from it for engaging upper portions of the bag and liner.

4. Apparatus in accordance with claim 3 wherein the overhead support assembly further includes tensioning means for raising the cross bar to apply upward force to said upper portions of said bag and liner.

5. Apparatus in accordance with claim 4 wherein said tensioning means includes a fluid pressure cylinder.

6. A method for dispensing material from a bulk bag having an inner liner and having openings at its upper and lower ends which are closable by closure means and which bag has support straps affixed to its upper end, the method comprising the steps of:

placing the bag on a cradle assembly which includes a cradle having a bottom portion defining an opening through which material from the bag may pass, and which further includes an overhead support;

securing the straps to said overhead support;

raising said overhead support to apply tension to the straps and to the bag to prevent the bag from collapsing downwardly as material is dispensed therefrom;

lifting the cradle assembly and bag and placing them on a support frame, opening the bag at its lower end, forming an opening in the bottom of the inner liner of the bag by driving a discharge assembly upward into the bottom of the bag, the discharge assembly including a discharge tube for receiving material from the bag through the opening in the liner and directing the material to a predetermined location; and regulating the flow of material through the discharge tube by manipulating valve means.

7. A method in accordance with claim 6 further comprising the step of forming a seal to restrict communication between the interior and the exterior of the bag adjacent the exterior of the discharge tube.

8. A method in accordance with claim 7 further comprising the step of opening the bag at its upper end and securing a portion of the liner to the overhead support to prevent the liner from collapsing downwardly as the bag empties.

* * * * *